US008425643B2

(12) United States Patent
Vivian et al.

(10) Patent No.: US 8,425,643 B2

(45) **Date of Patent: *Apr. 23, 2013**

(54) VENT HEAD

(75) Inventors: Tom Vivian, Gloucestershire (GB); Joe Rosagro, Gloucestershire (GB)

(73) Assignee: Spirax-Sarco Limited, Gloucestershire (GB)

( * ) Notice: Subject to any disclaimer, the term of this patent is extended or adjusted under 35 U.S.C. 154(b) by 7 days.

This patent is subject to a terminal disclaimer.

(21) Appl. No.: 13/167,874

(22) Filed: Jun. 24, 2011

(65) Prior Publication Data

US 2011/0314778 A1 Dec. 29, 2011

(30) Foreign Application Priority Data

Jun. 25, 2010 (GB) .................................. 1010719.1
Jun. 25, 2010 (GB) .................................. 1010720.9

(51) Int. Cl.
*B01D 45/08* (2006.01)

(52) U.S. Cl.
USPC .................. 55/462; 55/320; 55/463; 55/464; 55/465; 55/385.4; 55/DIG. 14; 55/DIG. 23

(58) Field of Classification Search .................... 55/320, 55/462–465, 385.4, DIG. 14, DIG. 23
See application file for complete search history.

(56) References Cited

U.S. PATENT DOCUMENTS

| | | | |
|---|---|---|---|
| 1,354,623 | A | 10/1920 | Redgate |
| 5,114,445 | A | 5/1992 | Burton et al. |

FOREIGN PATENT DOCUMENTS

| | | |
|---|---|---|
| GB | 189717655 | 0/1898 |
| GB | 1306268 | 2/1973 |
| GB | 1520631 | 8/1978 |
| JP | 2004347231 | 12/2004 |

OTHER PUBLICATIONS

Search Report issued in related GB Application No. GB1010719.1 dated Oct. 15, 2010.
Search Report issued in related GB Application No. GB1010720.9 dated Oct. 15, 2010.

*Primary Examiner* — Jason M Greene
*Assistant Examiner* — Dung H Bui
(74) *Attorney, Agent, or Firm* — Banner & Witcoff, Ltd.

(57) ABSTRACT

A vent head for a steam system is provided. In one embodiment, the vent head may comprise a body defining a vent head chamber and having a vent head outlet. The vent head comprises a steam inlet conduit having a steam outlet that opens into the vent head chamber and a baffle disposed within the vent head chamber and above the steam outlet. The baffle may have an impingement region and a convex portion which is disposed between the impingement region and the edge of the baffle. In use, the steam outlet discharges steam into the vent head chamber which impinges on the impingement region of the baffle, thereby separating entrained liquid water from the steam.

19 Claims, 6 Drawing Sheets

10 34 14 40 35 20 120 12 15 26 24 126 32 28 32 22 30 16 18 17

VENT HEAD

CROSS-REFERENCE TO RELATED APPLICATION

Figure 1:
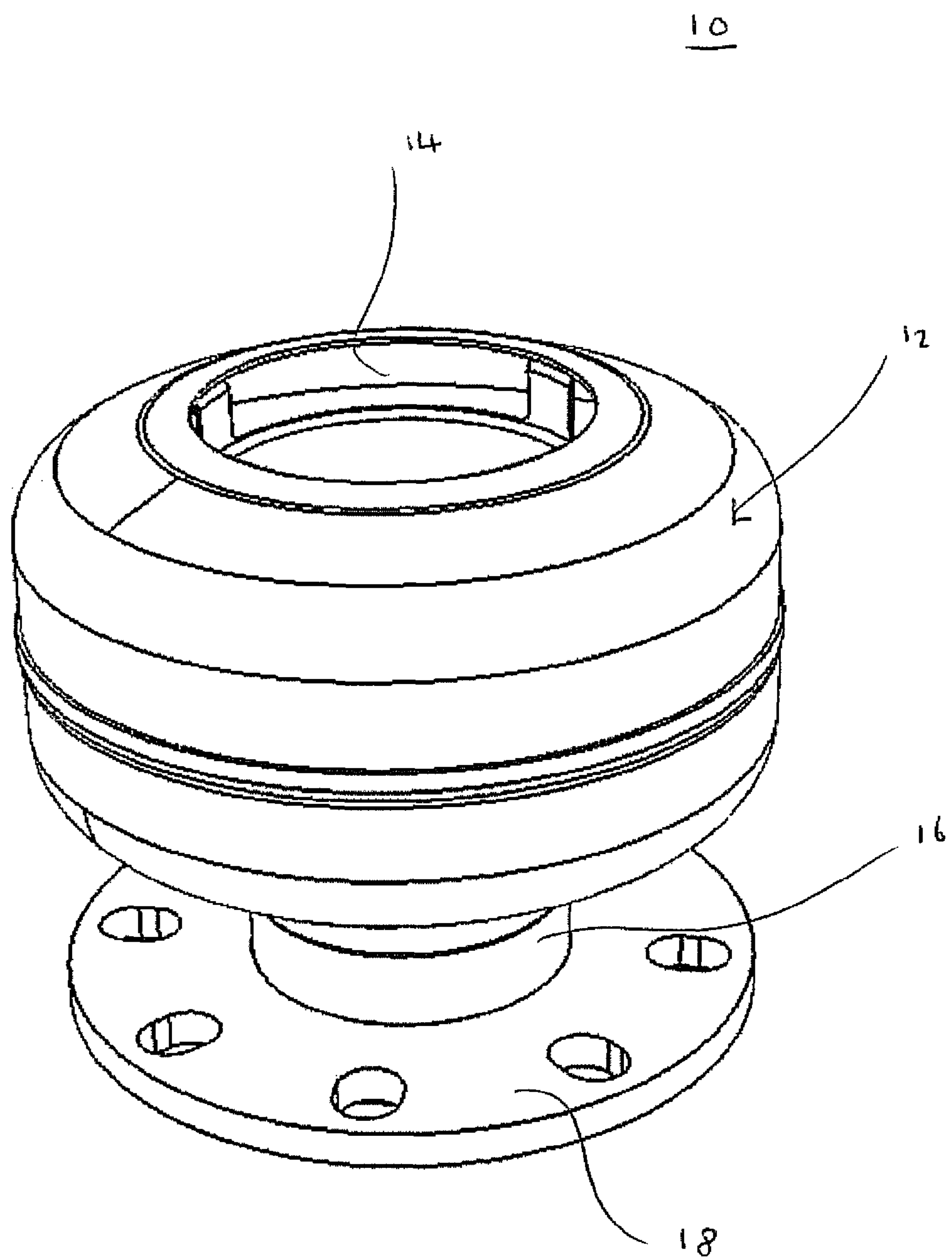

The present application claims priority to GB 1010720.9 filed on 25 Jun. 2010 and GB 1010719.1 filed on 25 Jun. 2010, which are each hereby incorporated by reference in their entirety for any and all purposes.

BACKGROUND

Aspects of the present invention relates to a vent head for a steam system.

In an industrial and heating process utilizing steam, steam is generated in a boiler and transferred through pipework at high temperature and pressure to various industrial processes where the energy in the steam is utilised.

Some steam system components, such as blow down vessels, include open-ended steam vent pipes that are used to vent steam to the atmosphere. It is known to provide the steam vent pipes with a vent head in order to safely discharge steam to the atmosphere at a low velocity.

One type of known vent head comprises a housing containing a baffle which is arranged to intercept steam entering the housing. The baffle causes water entrained within the steam to be separated from the steam. The dry steam is then vented to the atmosphere through an outlet in the housing and the separated water is fed to a drain line where it is drained from the steam system.

Whilst such a vent head is suitable for some applications, there are a number of drawbacks associated with it. For example, it is not capable of separating all of the water that is entrained in the steam. Further, known vent heads can be time consuming to install due to the pipework connections that are necessary.

It is therefore desirable to provide an improved vent head that addresses these and other needs.

SUMMARY

Aspects of the invention relate to vent heads and related methods that improve the separation of entrained water from steam and/or is less complicated to install.

According to an aspect of the present invention there is provided a vent head for a steam system, comprising: a body defining a vent head chamber and having a vent head outlet; a steam inlet conduit having a steam outlet that opens into the vent head chamber; and a baffle disposed within the vent head chamber and above the steam outlet, the baffle having an impingement region and a convex portion which is disposed between the impingement region and the edge of the baffle; wherein in use the steam outlet discharges steam into the vent head chamber which impinges on the impingement region of the baffle, thereby separating entrained liquid water from the steam.

The convex portion may have a radius of curvature such that in use water vapour flows around the convex portion to the vent head outlet, and water droplets are discharged from the convex portion into the vent head chamber. The radius of curvature of the convex portion may be between about 4 and about 7 mm. The radius of curvature of the convex portion may be about 5 mm. The convex portion may curve upwardly in the direction away from the impingement region and terminates at the edge of the baffle.

The steam inlet conduit may extend into the vent head chamber. The vent head may further comprise a drainage passageway providing fluid communication between the vent head chamber and the steam inlet conduit. The drainage passageway may comprise a hole provided in the portion of the steam inlet conduit which extends into the vent head chamber. There may be a plurality of drainage passageways, each comprising a hole provided in the portion of the steam inlet conduit which extends into the vent head chamber.

The body may comprise a bottom wall which slopes downwards towards an inlet of the drainage passageway.

The steam inlet conduit may comprise an attachment portion for attaching the steam inlet conduit to an open-ended steam vent pipe. The steam outlet may be arranged such that in use the steam is discharged in a substantially vertical direction.

The baffle may be substantially horizontal in use. The baffle may be substantially planar. The baffle may be substantially circular.

The body may comprise a top wall within which the vent head outlet is provided. The vent head outlet may be located above the baffle. The baffle may be disposed in the steam flow path between the steam outlet and the vent head outlet. When viewed from above, the baffle may extend beyond the steam outlet. The convex portion may be located in a position beyond the steam outlet.

According to a further aspect of the present invention there is provided a steam system comprising a steam vent pipe having a vent head in accordance with any statement herein.

The invention may comprise any combination of the features and/or limitations referred to herein, except combinations of such features as are mutually exclusive.

BRIEF DESCRIPTION

Figure 2:
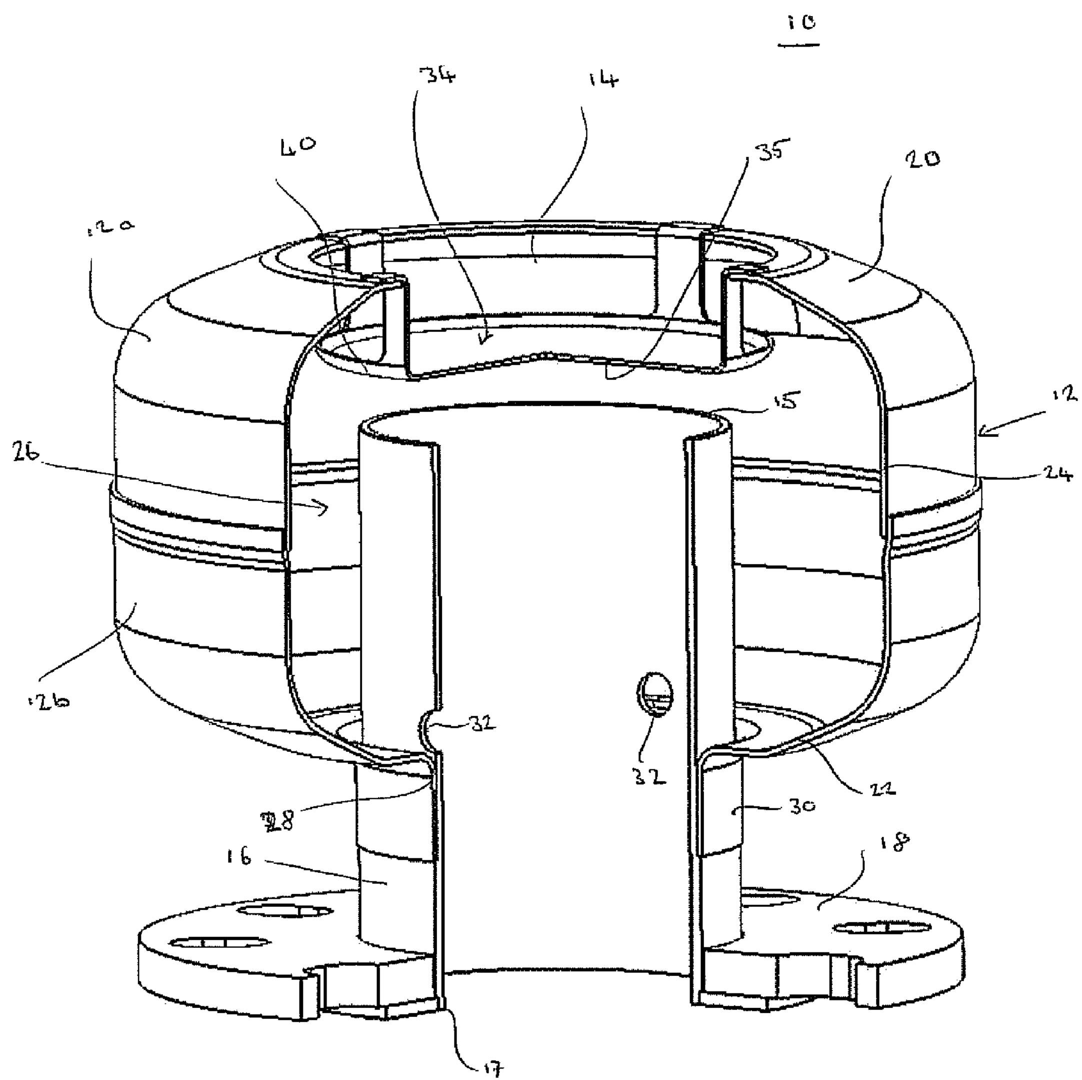
Figure 3:
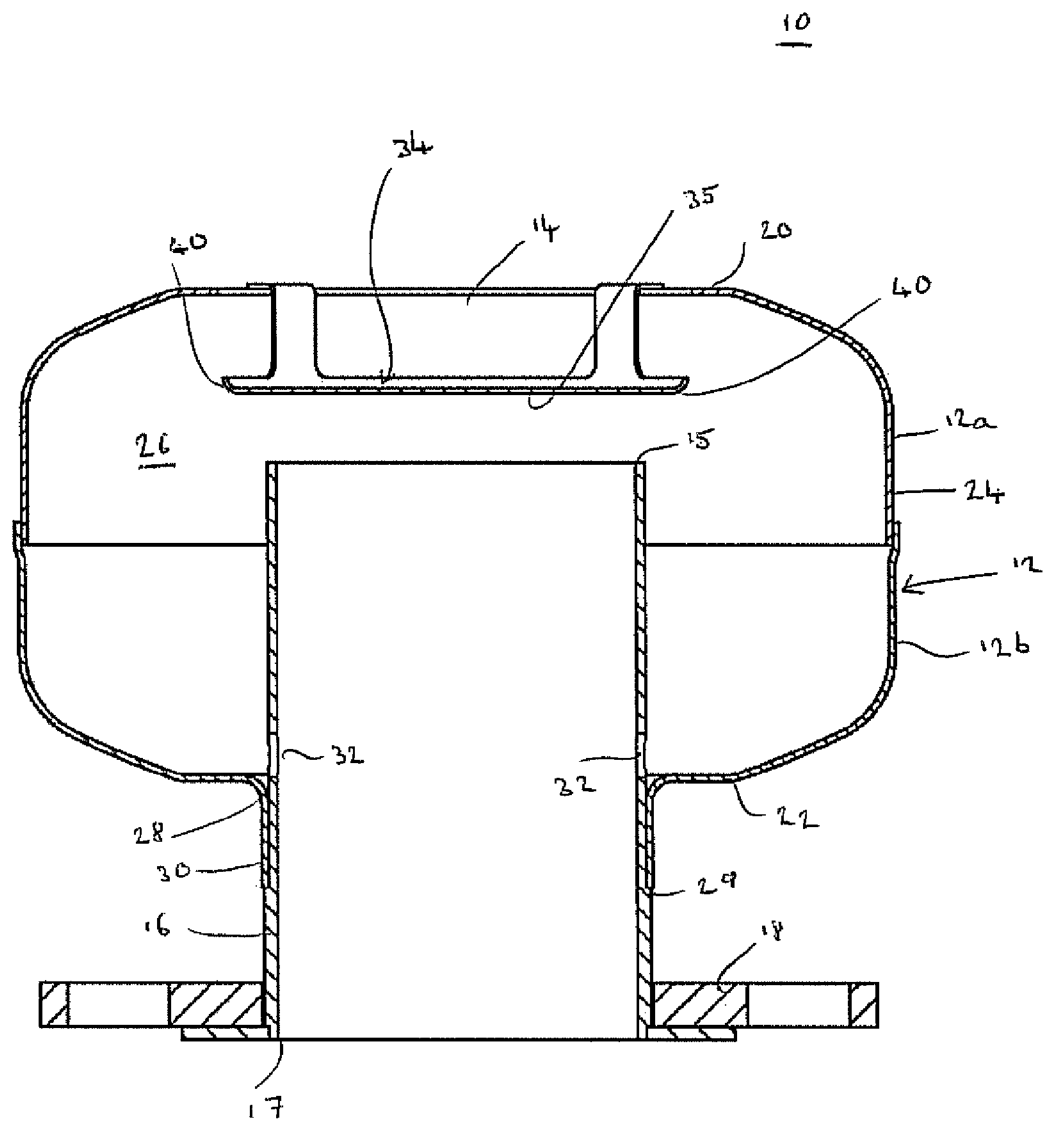
Figure 4:
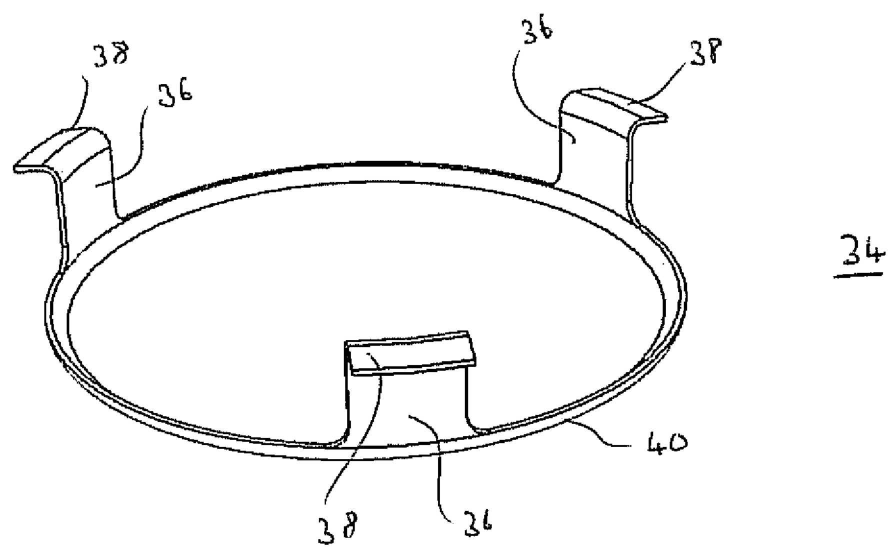
Figure 4:
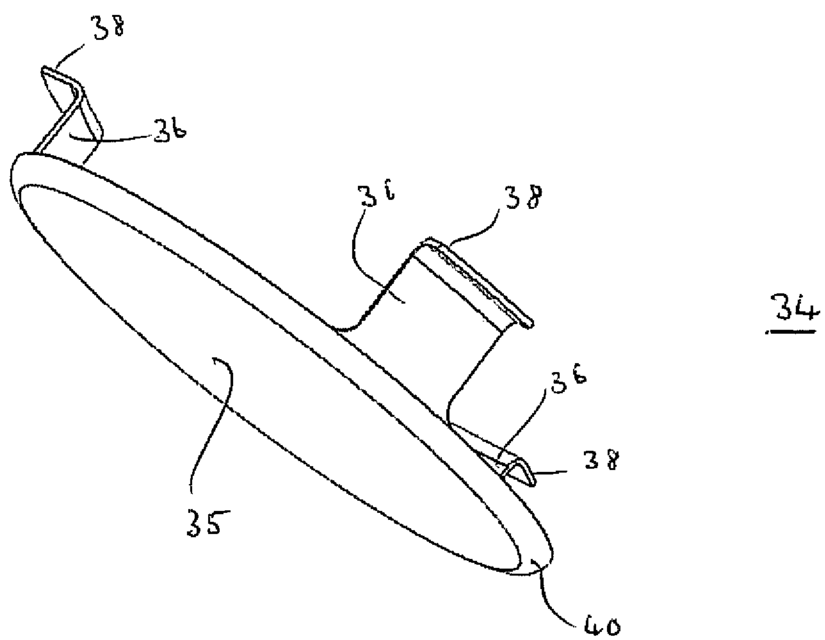
Figure 5:
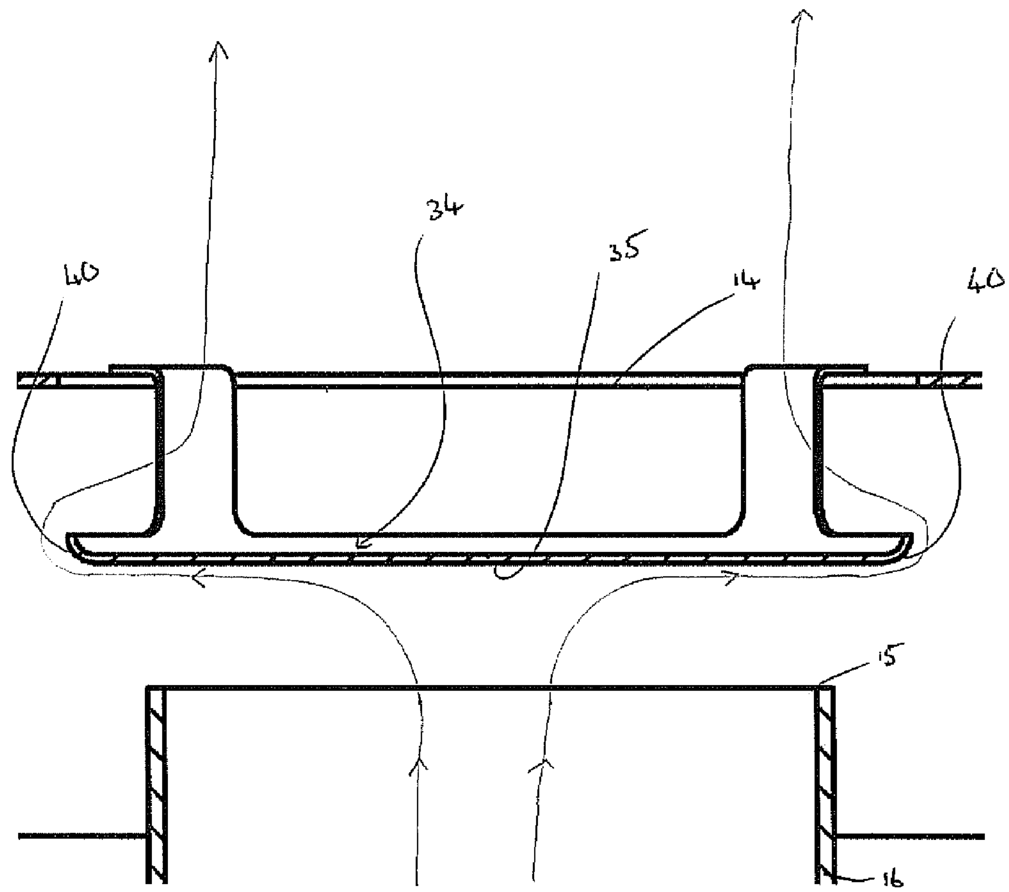
Figure 6:
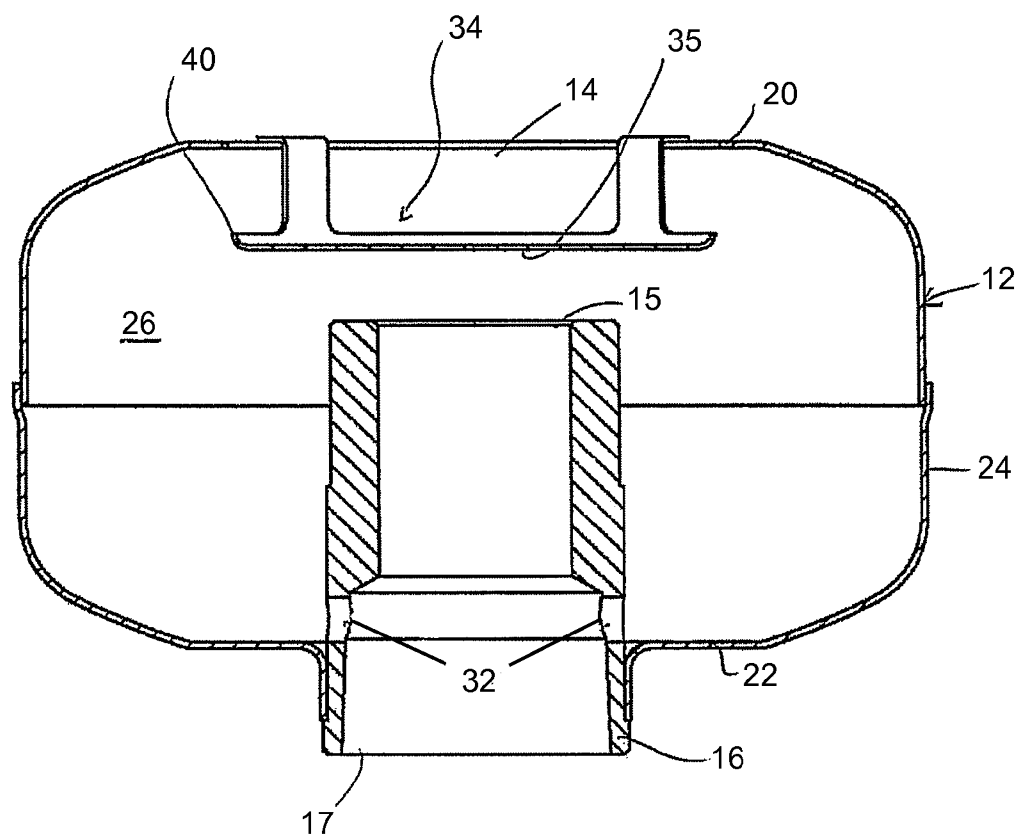

Embodiments of the present invention will now be described, by way of example only, with reference to the accompanying drawings, in which:

FIG. 1 schematically shows a perspective view of a first embodiment of a vent head;

FIG. 2 schematically shows the vent head of FIG. 1 with a section cut-away;

FIG. 3 schematically shows a cross-sectional view of the vent head of FIG. 1;

FIG. 4 schematically shows two views of the baffle of the vent head of FIG. 1;

FIG. 5 schematically shows an enlarged view of the baffle of the vent head of FIGS. 1; and FIG. 6 schematically shows a cross-sectional view of a second embodiment of a vent head.

DETAILED DESCRIPTION

As shown in FIG. 1, the vent head 10 may comprise a body 12 that is provided with a vent head outlet 14, and a steam inlet pipe (or conduit) 16. The steam inlet pipe 16 is provided with a flange 18 that can be used to attach the vent head 10 to an open-ended steam vent pipe that supplies steam that is to be discharged, or vented, to the atmosphere.

With reference to FIGS. 2 and 3, the body 12 of the vent head 10 comprises a top wall 20, a bottom wall 22, and an annular side wall 24 and therefore the body 12 is substantially cylindrical. The body 12 is made from a first upper part **12*a* that comprises the top wall 20 and a portion of the annular side wall 24, and a second lower part 12*b* that comprises the bottom wall 22 and a portion of the annular side wall 24. The upper and lower parts 12*a*, 12*b* are fitted together to form the body 12. The body 12 defines a vent head chamber 26 which is the interior of the body 12**.

A steam pipe opening 28 is provided in the bottom wall 22 of the lower part 12*b* of the body 12 and a collar 30 axially extends from the opening 28. The steam pipe opening 28 and the collar 30 are coaxial with the substantially cylindrical body 12. The steam inlet pipe 16 is located within the opening 28 so that the collar 30 surrounds and is in contact with the outer surface of the steam inlet pipe 16. The steam inlet pipe 16 is provided with an annular shoulder 29 which the edge of the collar 30 abuts. An upper portion of the steam inlet pipe 16 projects into the vent head chamber 26 and the open end of the upper portion constitutes a steam outlet 15. A lower portion of the steam inlet pipe 16 extends outside of the body 12 and the open end of the lower portion constitutes a steam inlet 17. The end of the lower portion of the steam inlet pipe 16 is provided with the flange 18 which allows the vent head 10 to be coupled to the end of a steam outlet pipe (not shown).

The steam inlet pipe 16 is provided with four drainage holes 32 that extend through the thickness of the inlet pipe 16. The drainage holes 32 are level with the bottom wall 22 of the body 12 and are circumferentially spaced from one another by 90°. The bottom wall 22 of the body 12 slopes downwards radially inwardly towards the steam inlet pipe 16 and the drainage holes 32. The drainage holes 32 provide a drainage passageway between the vent head chamber 26 and the steam inlet pipe 16.

The vent head outlet 14 is provided in the top wall 20 of the upper part 12*a* of the body 12 and is coaxial with the substantially cylindrical body 12. Therefore, the vent head outlet 14 is above the steam inlet pipe outlet 15.

A baffle 34 is disposed within the vent head chamber 26 and is located above the steam outlet 15 and below the vent head outlet 14. The baffle 34 is therefore disposed between the steam outlet 15 and the vent head outlet 14. In this embodiment the baffle 34 is substantially planar and lies in a substantially horizontal plane when in use. The baffle 34 is substantially circular and is coaxial with the cylindrical body 12. The diameter of the circular baffle 12 is larger than the diameter of the steam outlet 15 and therefore, when viewed from above, the edge of the baffle 34 extend beyond the steam outlet 15. In this embodiment, the diameter of the circular baffle 34 is approximately the same as the diameter of the vent head outlet 14.

As shown in detail in FIG. 4, the baffle 34 comprises a central impingement region 35 and a convex portion 40 which curves upwards. The convex portion 40 is located between the impingement region 35 and the edge of the baffle 34. In this embodiment the convex portion 40 is the annular edge of the baffle 34 which is curved upwardly. The radius of curvature of the convex portion 40 in this embodiment is approximately 5 mm. However, the radius of curvature may be between 4 and 7 mm in other embodiments. The purpose of the convex portion 40 will be described below.

The baffle 34 is provided with three supporting members 36 that are attached to the edge of the baffle 34 and are circumferentially spaced from one another by 120°. The supporting members 36 extend in the axial direction and each supporting member 36 comprises a lip 38 that projects radially outwardly from the end of the supporting member 36. The supporting members 36 are used to attach the baffle 34 to and support the baffle 34 from the body 12. As shown in FIGS. 2 and 3, the lips 38 of the supporting members 36 engage with the edge of vent head outlet 14 and rest on the top wall 20 of the body 12, thereby supporting the baffle 34 from the body 12.

In use, the vent head 10 is attached to the open end of a steam vent pipe (not shown) by means of the flange 18. The steam vent pipe may be the steam vent pipe of any part of a steam system where steam is discharged, or vented, to the atmosphere. Examples include, but are not limited to, the steam vent pipe of a blow-down vessel, a hotwell tank, a feed tank or a pressure-powered pump.

Steam is introduced into the vent head 10 through the steam inlet 17 of the steam inlet pipe 16. The steam is then discharged in a substantially vertical direction into the vent head chamber 26 from the steam outlet 15 of the steam inlet pipe 16.

As shown in FIG. 5, the steam exiting the steam outlet 15 impinges on the impingement region 35 of the horizontal baffle 34 which is disposed directly above the steam outlet 15. As the steam impinges on the baffle 34, water droplets that are entrained in the steam flow adhere to the surface of the baffle due to surface tension and are therefore separated from the steam flow. Due to the pressure drop between the vent head chamber 26 and the atmosphere, the steam flows towards the vent head outlet 14 and therefore flows radially outwards over the surface of the baffle 34. The flow of steam over the surface of the baffle 34 drags the water droplets that are adhered to the surface of the baffle 34 by surface tension radially outwards over the surface of the baffle 34 towards the edge of the baffle 34.

As the steam approaches the convex portion 40 of the baffle 34 the water vapour is attracted to the convex portion 40 of the baffle 34 and therefore flows around it and exits the vent head 10 through the vent head outlet. The water vapour flows around the convex portion 40 by virtue of the Coandă effect. However, the water droplets adhered to the baffle 34 surface are too heavy to be dragged around the convex portion 40 by the steam flow and therefore are discharged from the convex portion 40. Since the convex portion 40 is located outside of the steam outlet 15, these water droplets are collected in the bottom of the vent head chamber 26. The water separated from the steam by the baffle 34 flows radially inwards along the downwardly sloped bottom wall 22 of the baffle 26 towards the steam inlet pipe 16. The separated water then flows through the drainage holes (drainage passageway) 32 in the steam inlet pipe 16 into the interior of the pipe 16. The water is then caused to flow down the internal wall of the steam inlet pipe 16 and is returned to the steam system.

The vent head 10 allows the safe discharge of steam to the atmosphere. This is because the baffle 34 slows down the velocity of the steam, and a large proportion of the water droplets entrained within the steam is separated from the steam by the baffle. This results in substantially dry steam being discharged from the vent head outlet.

Returning the liquid water separated from the steam to the steam system provides a number of benefits. The water used in the steam system contains various treatment chemicals that help to improve the performance of the system. If water is lost from the system then it is necessary to replenish that water with fresh water which must be treated with these chemicals. Therefore, reducing the amount of water that is lost from the steam system reduces the amount of fresh treatment chemicals that must be added to the system. This provides a cost saving. Further, water lost from the steam system contains useful heat and therefore returning the liquid water separated from the steam by the baffle improves the energy efficiency of the system.

A further benefit is that it is not necessary to provide an external drain line connection to the vent head 10 since the separated water is returned to the steam system down the steam inlet pipe 16. This reduces the amount of pipework and external connections that is required and therefore results in a less expensive and a quicker installation.

The convex portion 40 of the baffle 34 extracts (or separated) more liquid water from the steam that can be achieved with conventional baffles. This is at least partly due to the Coandă effect which causes the water vapour to be attracted to and flow around the convex portion 40, whilst forcing water droplets to be discharged into the vent head chamber 26. The radius of curvature of the convex portion 40 is chosen such that the flow of water vapour across the baffle 34 is attracted to the convex portion 40 and therefore flows around it, whilst water droplets are discharged from the convex portion 40.

FIG. 6 shows a second embodiment of a vent head 10. This embodiment is similar to the first embodiment except the upper portion of the steam inlet pipe 16 has an increased thickness. Further, the lower portion of the steam inlet pipe 16 is not provided with a flange and is therefore coupled to a steam vent pipe by alternative means.

The invention claimed is:

1. A vent head for a steam system, comprising:

a body defining a vent head chamber and having a vent head outlet;

a steam inlet conduit extending along a vertical axis and having a steam outlet that opens into the vent head chamber; and a baffle disposed within the vent head chamber, with respect to the vertical axis, above the steam outlet, the baffle having an impingement region and a convex portion which is curved out of the plane of the impingement region and is disposed between the impingement region and the edge of the baffle;

wherein the steam outlet, upon being operatively connected to a steam system, is configured to discharge steam into the vent head chamber which impinges on the impingement region of the baffle, causing entrained liquid water to adhere to the baffle;

wherein the convex portion has a radius of curvature configure to cause water vapour to flow along a flow path adjacent to the convex portion to the vent head outlet, and further to cause water droplets to be discharged from the convex portion out of the flow path to collect within the vent head chamber.

2. A vent head according to claim 1, wherein the radius of curvature of the convex portion is between about 4 and about 7 mm.

3. A vent head according to claim 1, wherein the radius of curvature of the convex portion is about 5 mm.

4. A vent head according to claim 1, wherein the convex portion curves, with respect to the vertical axis, upwardly in the direction away from the impingement region and terminates at the edge of the baffle.

5. A vent head according to claim 1, wherein the steam inlet conduit extends into the vent head chamber.

6. A vent head according to claim 5, further comprising a drainage passageway providing fluid communication between the vent head chamber and the steam inlet conduit.

7. A vent head according to claim 6, wherein the drainage passageway comprises a hole provided in the portion of the steam inlet conduit which extends into the vent head chamber.

8. A vent head according to claim 7, wherein the drainage passageway comprises a plurality of holes provided in a portion of the steam inlet conduit which extends into the vent head chamber.

9. A vent head according to claim 8, wherein the body comprises a bottom wall which, with respect to the vertical axis, slopes downwards towards an inlet of the drainage passageway.

10. A vent head according to claim 1, wherein the steam inlet conduit comprises an attachment portion configured to attach the steam inlet conduit to an open-ended steam vent pipe.

11. A vent head according to claim 10, wherein the steam outlet is configured such that upon connection to a steam system, the steam is discharged, with respect to the vertical axis, in a substantially vertical direction.

12. A vent head according to claim 11, wherein the baffle is substantially perpendicular to the vertical axis.

13. A vent head according to claim 12, wherein the baffle is substantially planar.

14. A vent head according to claim 13, wherein the baffle is substantially circular.

15. A vent head according to claim 14, wherein the body comprises a top wall within which the vent head outlet is provided.

16. A vent head according to claim 1, wherein the vent head outlet, with respect to the vertical axis, is located above and vertically aligned with the baffle.

17. A vent head according to claim 1, wherein the baffle is disposed in the steam flow path between the steam outlet and the vent head outlet.

18. A vent head according to claim 17, wherein the baffle comprises a larger horizontal length than the steam outlet.

19. A vent head according to claim 1, wherein the convex portion is located in a position that, with respect to the vertical axis, is above the steam outlet.

* * * * *